Patented Aug. 27, 1940

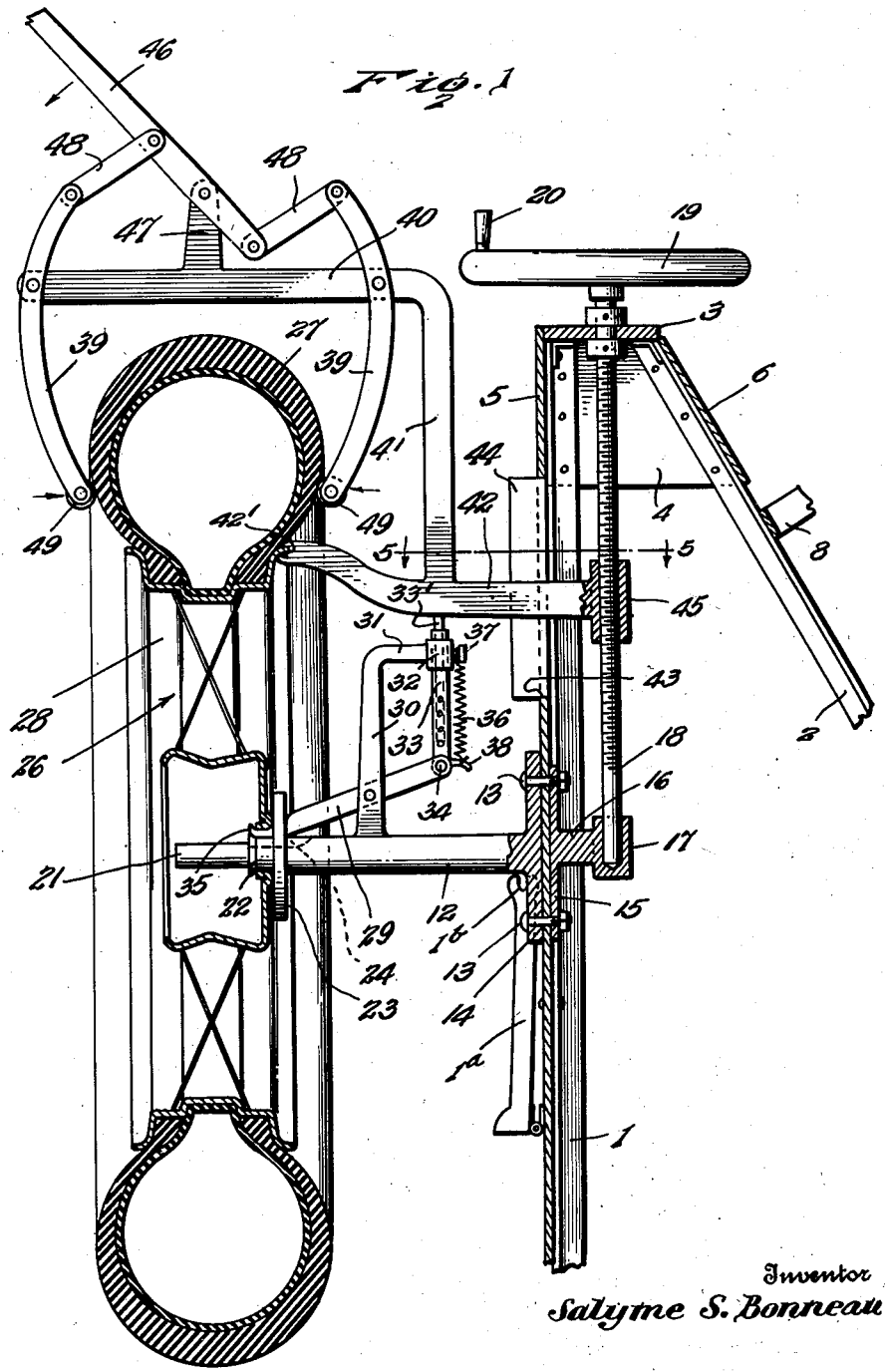

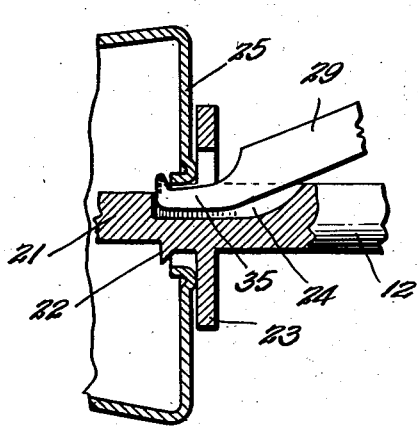
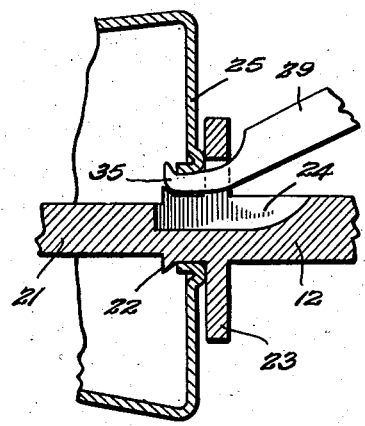
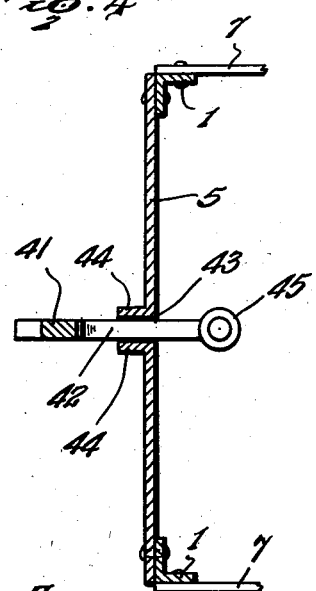
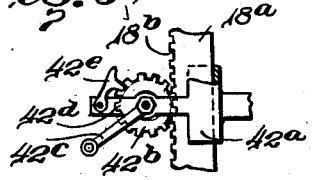

2,212,768

UNITED STATES PATENT OFFICE 2,212,768

TIRE-REMOVING AND COMPRESSING APPARATUS

Salyme S. Bonneau, McAllen, Tex.

Application October 4, 1937, Serial No. 167,321

6 Claims. (Cl. 157—6)

This invention relates to a tire-removing apparatus for use in a tire shop, and it is one object of the invention to provide an apparatus of this character by use of which a tire may be very easily loosened for removal from a wheel rim of the drop center type.

Another object of the invention is to provide an apparatus of this character of such construction that a wheel with a tire thereon may be rotatably mounted for turning movement during loosening of the tire and thus permit the tire to be broken loose from the rim in step by step movement.

It is another object of the invention to provide the apparatus with improved means for rotatably mounting the wheel, the said mounting means having associated therewith companion means for securing the wheel in a set position.

Another object of the invention is to provide actuating means for the securing means serving not only as actuating means for the securing means but also as a carrier for compressing jaws and thus assuring proper disposition of the jaws for exerting pressure against opposite sides of a tire when the apparatus is in use.

Another object of the invention is to provide an apparatus of this character which is simple in construction and very easy to operate.

The invention is illustrated in the accompanying drawings, wherein

Figure 1 is a view of the wheel-carrying and tire-compressing mechanism of the apparatus, the view being partially in side elevation and partially in section, Figure 2 is an enlarged view showing the hub of the wheel loosely engaged with the wheel-carrying mechanism, Figure 3 is a view similar to Figure 2 showing the hub of the wheel secured in a set position in which it will be held against turning, Figure 4 is a fragmentary sectional view taken along the line 5—5 of Figure 1, Figure 5 is a fragmentary view illustrating a modified construction.

This improved tire-compressing apparatus has a main frame which is similar to a tripod in construction and provided with front legs 1 and rear legs 2, the upper ends of which are secured to a platform 3 and braced by side plates 4 and front and rear plates 5 and 6. The side and rear plates 4 and 6 are short plates but the front plate 5 extends the full height of the frame. Side bars extend between lower end portions of the front and rear bars to brace the frame and there has also been provided rear braces 8 in the form of brackets having arms which project rearwardly from the frame, as shown in Figure 1. A shelf is mounted at the front of the frame upon brackets, and this shelf is located in such spaced relation to the bottom of the frame that it will be out of the way when the apparatus is in use and still at such a height that tools placed thereon can be easily reached.

The wheel-holding and tire-compressing mechanism is carried by the bracket at the front thereof. In order to support the wheel, there has been provided an arm 12 which is secured at the front of the frame by bolts 13 extending through the back plate 14 of the arm and also through a cross bar 15 which extends transversely across the frame and is secured to the front leg in any desired manner. This cross bar carries an arm 16 which projects rearwardly therefrom and terminates in a bearing or socket 17 serving to rotatably mount the lower end of a shaft or stem 18 which is threaded and has its upper end portion journaled through the platform 3 and carrying a hand wheel 19 equipped with a handle 20 in order that the hand wheel may be easily turned to rotate the shaft. At its front end the arm 12 is formed with a stem or spindle 21 of reduced diameter and about the inner or rear end of the spindle the arm is formed with a circumferentially extending collar 22. There has also been provided a disk 23 spaced rearwardly from the collar, and upon referring particularly to Figures 2 and 3, it will be seen that the arm is formed with a longitudinally extending groove or recess 24 which passes through the disk and through the collar and has extensions formed radially of the disk and the collar. The portion of the arm between the disk and the collar serves as a seat to receive the hub 25 of the wheel 26 and the disk and collar serve to prevent the wheel from slipping out of place when turned about the arm between the disk and collar. The beads or heels of the tire 27 are to be broken loose from the side flanges of the rim 28 of the wheel, which is a drop center rim, in step by step movement, and in order that the wheel may be held stationary during compression of the tire to break it loose from the rim, there has been provided a latching arm or lever 29 which is pivoted intermediate its length to a standard 30 rising from the arm 12 between the disk 23 and the rear end of the arm. This standard has its upper end portion extended rearwardly, as shown at 31, and terminates in a sleeve 32 through which a plunger 33 carrying a removable core or pin 33' is slidably mounted. The lower end of the plunger is pivoted to the rear end portion of the latching arm 29 by a pin 34, and in order to normally hold the latching arm in the position shown in Figure 2 with the bill 35 at its front end seated in the groove or recess 24, there has been provided a spring 36 which extends vertically and has its upper end connected with an anchoring pin 37 carried by the sleeve 32 and its lower end engaged with a tooth 38 at the rear end of the latching arm. When pressure is applied to the upper end of the core 33' to force the plunger downwardly against action of the spring 36, the forward portion of this latching arm will be swung upwardly so that the bill 35 will shift the wheel upwardly and move the lower portion of its hub into tight binding engagement with the under face of the arm. It will thus be seen that the wheel will be frictionally held against turning movement about the arm and its spindle and held stationary so that pressure may be applied to opposed portions of side walls of the tire and the heels or beads of the tire broken loose from the flanges of the drum center rim. It should be understood that the spring 36 normally holds the securing arm 29 in inoperative position.

In order to apply pressure to opposite portions of side walls of the tire, there have been provided jaws 39 which are pivoted to front and rear end portions of the horizontally extending upper arm 40 of a bracket 41. This bracket or carrier has a rearwardly extending arm 42 at its lower end which passes through a slot 43 formed vertically in the front plate 5 of the frame. Flanges 44 extend along the slot 43 at opposite sides thereof, as shown in Figure 4, to guide vertical movement of the bracket when it is adjusted to prevent undue side play of the bracket during use of the apparatus. An internally threaded sleeve 45 is formed at the rear end of the arm 42 to receive the threaded stem or shaft 18, and from an inspection of Figure 1, it will be readily seen that, when the shaft 18 is turned, the bracket 41 will be vertically adjusted. When this bracket is shifted downwardly, its arm 42 will engage the upper end of the core 33' of the plunger 33 and move the plunger downwardly to rock the latching arm 29 about its pivot and cause its bill 35 to be shifted upwardly and frictionally hold the wheel against turning. During this downward movement of the bracket 41, the jaws will be shifted downwardly into position at opposite sides of the tire. By providing a number of cores 33' of different lengths and inserting one of the proper length in the hollow plunger, the core will project upwardly from the plunger the proper distance to allow the arm 42 to rest upon the upper end of the core and at the same time be disposed at such a height that it may engage the rim of the wheel. Therefore, wheels of different diameters may be accommodated. An actuating lever 46 is provided for the jaws and this lever is pivoted to a post or fulcrum 47 extending upwardly from the arm 40 of the bracket 41 midway the length thereof. Links 48 connect the upper ends of the jaws with the lever, one link being located at the lower end of the lever and the other being pivoted to the lever above the pivotal connection of the lever with the post 47. It will be readily appreciated that, when the outer or upper end of the lever 46 is grasped and swung downwardly, upper ends of the jaws will be shifted away from each other by the links and the lower ends of the jaws moved towards each other until the rollers 49 at their lower ends make contact with opposed side portions of walls of the tire. Continued movement of the jaws in the compressing direction will cause such pressure to be applied to the side walls of the tire that the beads or heels of the tire will be broken loose from the rim. In view of the fact that the walls of the tire are engaged by the rollers, damage to the tire will be avoided. After pressure has been applied to break the walls of the tire loose from the rim, the lever may be shifted upwardly to move the jaws away from each other and the wheel then turned in a direction to rotate the shaft 18 and elevate the bracket 41 a sufficient distance to permit the spring 36 to return the latching arm to the position shown in Figure 2. The wheel may then be turned to bring another portion of the tire into position between the jaws and the hand wheel and the shaft again turned in a direction to lower the bracket and move the latching arm into position to engage the hub of the wheel and secure the wheel in a set position. The lever 46 will then be swung about its pivot in a direction to move the lower ends of the jaws towards each other in a compressing direction and the portion of the tire engaged by the jaws will be broken loose from the rim of the wheel. This will be repeated until all portions of the tire have been broken loose from the wheel rim. The tire may then be easily removed from the rim in the usual manner for repairing of a puncture or application of a new tire.

In case a tire is to be removed from a wheel having a large center opening and the tooth or bill of the arm 29 cannot have gripping engagement with the hub about the margin of the opening, a pair of arms, one of which is shown at 1ª, is hinged to the frame 1 adjacent opposite sides thereof and swung downwardly, and marginal portions of the rim of the wheel engaged in forks 1ᵇ of the arms 1ª and in a notch 42' at the front end of the arm 42.

Instead of adjustably mounting the arm 42 as shown in Figure 1, it may be mounted as shown in Figure 5. Referring to Figure 5, it will be seen that the arm 42 carries at its inner or rear end of a yoke 42ª which straddles a bar 18ª taking the place of the shaft 18 and provided with a rack 18ᵇ along one edge. A gear 42ᵇ turned by a crank 42ᶜ is carried by the arms 42ᵈ of the yoke and meshes with the teeth of the rack so that by turning the gear the arm 42 can be vertically adjusted. A pawl 42ᵉ is provided for engaging the gear and releasably securing the arm 42 in an adjusted position.

Having thus described the invention, what is claimed as new is:

1. In an apparatus of the character described, a frame, means for rotatably supporting a wheel, securing means mounted on the frame and being movable for holding the wheel stationary upon the wheel-supporting means, a support shiftable on the frame and being movable to engage said securing means and move the same into position to secure the wheel stationary, and gripping means carried by said support for applying pressure to walls of a tire carried by the wheel and forcing the walls of the tire towards each other to break the tire loose from the rim of the wheel, said tire-gripping means being moved into and out of position to engage the tire at opposite sides thereof when the support is moved.

2. In an apparatus of the character described, a frame, a wheel holder carried by said frame and adapted to rotatably support a wheel, a fastener carried by said wheel holder and movable into and out of position to secure the wheel stationary upon the wheel holder, a support above the wheel holder and fastened, a mounting for said support adapted to shift the support vertically, said support when shifted downwardly being adapted to engage said fastener and move the same into position to secure a wheel stationary, and jaws carried by said support and movable vertically therewith into and out of position to engage opposed portions of side walls of a tire carried by the wheel, said jaws being adapted to force the walls of the tire towards each other and break the tire loose from the rim of the wheel.

3. In an apparatus of the character described, a frame, an arm extending from said frame and provided with an annular wheel-receiving seat to rotatably mount a wheel upon the arm, a post rising from said arm, a securing arm pivoted to said post and extending longitudinally of said arm with its outer end extending across the wheel-receiving seat, a spring normally holding the securing arm in an inoperative position, an actuating plunger for the securing arm extending upwardly from the inner end thereof and slidably mounted, a mounting disposed above the post and plunger and shiftable vertically of the frame, the mounting when moved downwardly being adapted to engage the plunger and depress the same to move the securing arm into position to cause its outer end to engage a wheel and hold the wheel stationary, jaws carried by said mounting and movable therewith into position to dispose the jaws at opposite sides of a tire when the mounting is shifted downwardly, and actuating means for said jaws adapted to move lower ends of the jaws towards each other for applying pressure to opposed portions of side walls of the tire and break the tire loose from the rim of the wheel.

4. In an apparatus of the character described, a frame, a support carried by said frame for rotatably mounting a wheel, a fastener carried by said support and when in an operative position being adapted to engage a wheel upon the support and hold the wheel stationary, said fastener having a slidably mounted actuating member extending vertically, means movably attaching the fastener to the frame, a vertically disposed shaft rotatably mounted in said frame and threaded, a mounting disposed over the wheel carrier and the plunger of said fastener and having an internally threaded sleeve in threaded engagement with said shaft, means for rotating the shaft to shift the mounting vertically, the mounting when moved downwardly being adapted to engage the plunger and effect movement of the fastener to its operative position, jaws carried by said mounting in straddling position with respect to a tire carried by the wheel when the mounting is shifted downwardly, lower portions of said jaws being positioned to engage walls of the tire at opposite sides thereof, and actuating means for moving the jaws into compressing engagement with the walls of the tire and causing the tire to be broken loose from the rim of the wheel.

5. In an apparatus of the character described, a frame, a support carried by said frame and adapted to rotatably mount a wheel carrying a tire upon its rim, a fastener carried by said support and yieldably held in an inoperative position out of engagement with the wheel, means movably mounting the fastener on the frame, a mounting arm shiftable vertically and when moved downwardly being adapted to move the fastener to an operative position for securing the wheel stationary, jaws pivoted to said mounting arm in a vertical plane and having lower portions disposed in position to engage the tire at opposite sides of the walls thereof when the mounting is shifted downwardly, an actuating lever pivoted to the mounting arm, and links connecting said lever with upper ends of said jaws whereby the jaws may be swung about their pivots and lower ends of the jaws moved towards each other for applying pressure to the tire and breaking the tire loose from the rim of the wheel.

6. In an apparatus of the character described, a frame having corner posts and a head plate, a front plate for said frame and formed with a vertically extending slot, an arm extending forwardly from the front plate and adapted to rotatably support a wheel carrying a tire, a bearing disposed rearwardly of the front plate, a shaft disposed vertically in the frame with its lower end rotatably supported by said bearing and its upper portion journaled through the head plate, said shaft being threaded and having turning means at its upper end, a post extending upwardly from the tire-supporting arm and having its upper portion extended rearwardly and formed with a sleeve, a fastener bar pivoted to said post and extending longitudinally of the supporting arm with its forward portion disposed in position to engage a wheel carried by the arm and secure the wheel stationary, a spring for yieldably holding the fastener bar in an inoperative position, a plunger extending upwardly from the inner end of the fastener bar and slidably engaged through said sleeve, a mounting member having upper and lower horizontal arms and a standard connecting the same, said lower arm extending through the slot of the front plate and provided with an internally threaded sleeve at its rear end fitting about the shaft in threaded engagement therewith whereby vertical adjustment will be effected when the shaft is turned, the lower arm when moved downwardly being adapted to engage the upper end of the plunger and apply pressure to move the fastener bar to an operative position, jaws disposed vertically and pivoted to the upper arm of said mounting with their lower portions disposed in position to engage walls of the tire at opposite sides thereof when the mounting is shifted downwardly by turning of said shaft, a post extending upwardly from the upper arm between said jaws, a lever pivoted to said post, and links connecting the lever with upper ends of said jaws for imparting movement to the jaws and swinging lower ends of the jaws towards each other to apply pressure to walls of the tire and break the tire loose from the rim of the wheel.

SALYME S. BONNEAU.